United States Patent [19]

Hölzer

[11] Patent Number: 4,591,168
[45] Date of Patent: May 27, 1986

[54] SEALING RING HAVING TORSION RIBS

[75] Inventor: Helmut Hölzer, Weinheim, Fed. Rep. of Germany

[73] Assignee: Firma Carl Freudenberg, Weinheim, Fed. Rep. of Germany

[21] Appl. No.: 675,131

[22] Filed: Nov. 27, 1984

[30] Foreign Application Priority Data

Jan. 21, 1984 [DE] Fed. Rep. of Germany ....... 3402109

[51] Int. Cl.$^4$ .............................................. F16J 15/32
[52] U.S. Cl. .................................. 277/134; 277/152; 277/1
[58] Field of Search ............... 277/134, 152, 153, 165, 277/207 R, 212 R, 212 F, 215

[56] References Cited

U.S. PATENT DOCUMENTS

| 4,283,064 | 8/1981 | Staab et al. ............... 277/134 X |
| 4,427,205 | 1/1984 | Holzer et al. ................. 277/134 |
| 4,447,064 | 5/1984 | Ehrmann et al. ............. 277/134 |

FOREIGN PATENT DOCUMENTS

| 711737 | 10/1941 | Fed. Rep. of Germany . |
| 3150472 | 7/1983 | Fed. Rep. of Germany . |
| 46-36124 | 10/1971 | Japan ......................... 277/134 |
| 57-163769 | 10/1982 | Japan ......................... 277/134 |

Primary Examiner—Robert S. Ward
Attorney, Agent, or Firm—Felfe & Lynch

[57] ABSTRACT

A sealing ring for sealing about a relatively-rotatable member is an annular, disk-like ring having a root surface about one edge which is adjacent a flarable, sealing-surface zone for slidingly engaging the member. Torsion ribs project from the root surface. The inside surfaces of the torsion ribs are regular prolongations of the sealing surface and the distance therefrom to opposite, outside surfaces diminishes, preferably continuously to a knife-like edge where the inside and outside surfaces meet. The result peels liquid to be sealed in from the relatively-rotating member so that it does not destructively deform the torsion ribs even at high speeds of relative rotation.

22 Claims, 3 Drawing Figures

SEALING RING HAVING TORSION RIBS

BACKGROUND OF THE INVENTION

The invention relates to a sealing ring for radially sealing about a relatively-rotating member and, more particularly, a sealing ring which flaringly engages the member at one end and has torsion ribs thereat.

A sealing ring radially sealing about a relatively-rotating member is described in German Pat. No. 31 50 472. It consists of a casing holding a circular, polymeric sealing ring which flares toward the rotating member in the direction of the medium to be sealed in. One side of the flaring ring slidingly engages the relatively-rotating member to form a sealing surface. The adjacent end of the ring is edged with torsion ribs defined on the side facing the relatively-rotating member by an inner surface which forms a regular (smooth) prolongation of the sealing surface. The torsion ribs undergo considerable deformation after a relatively brief time in operation, however, which impairs the excellent sealing performance of this sealing ring.

German Pat. No. 711,737 discloses a radial shaft-sealing ring in which the sealing surface ends in a knife-edge-like profile pointing toward the sealed medium. It cannot be used for sealing fast-turning shafts, however, for in these cases, rapid thermal destruction of the sealing lip takes place.

SUMMARY OF THE INVENTION

It is, therefore, an object of the invention to improve a radial shaft sealing ring in such a way that the function-impairing deformations of torsion ribs no longer occur and the sealing ring is durable in use with fast-turning shafts.

This and other objects are achieved by the invention of an annular sealing ring having torsion ribs projecting from a root surface about an edge adjacent a flarable, substantially-smooth, sealing-surface zone of the sealing-ring. The torsion ribs are defined on the side of the ring opposite that flarable for slidingly engaging a relatively-rotating member by an outside surface the distance between which and an opposite inside surface diminishes with increasing distance from the root surface.

As described in German Pat. No. 31 50 472, the inside surface of the torsion ribs separates from the surface of the member to be sealed at a small angle because there is no indentation between the inside surface of the torsion ribs and the actual, member-contacting sealing surface of the sealing ring and the substantially-smooth sealing surface progresses regularly (smoothly) into the inside surface of the torsion ribs.

The outside surface of the torsion ribs opposite the inside, sealing-surface side therefore tapers toward the sealed member. This evenly peels off the film of sealed-in liquid medium which is carried along the relatively rotating member, except for a slight residual amount which, however, is insufficient to apply deforming force to the lateral or flank surfaces of the torsion ribs. It is probably for this reason that no appreciable deformation of the torsion ribs is observed even after long periods of operation at rotary speeds of the sealed member of more than 3000 rpm.

The sealing ring is preferably in the form of a planar, circularly-annular disk which is flared toward the rotating member and the sealed medium in a zone about its inside or outside circumference. The inside of the flare forms the sealing surface which slidingly engages the rotating member to be sealed. Producing such a flare can require a separate working step, but this can be avoided if the sealing ring is flared by its manufacture in a shape substantially the same as that for use.

It has proven best in this regard for the sealing ring to be cut off of a tube in the form of a hollow cone. In this case, it can easily be gripped adjacent its larger or smaller-diameter ends between axially-spaced radial gripping surfaces of a correspondingly annular casing without the need for a previous reshaping process. The flare curvature then is produced automatically when the sealing ring is resiliently deformed in the area of its sealing surface by assembly about the relatively-rotating member to be sealed.

The torsion ribs can be created at any time during the production of the sealing ring. They are produced automatically if the sealing ring in hollow, conical form is cut from a revolving tube which has appropriately-shaped, axis-parallel ribs on its inside or outside surface. Such a tube can be produced with relative ease. The hollow cones taken from it must, however, be flared back on themselves in order to assure that the inside surface of the torsion ribs actually forms a prolongation of the sealing surface. Sealing ring-suitable polytetrafluoroethylene (PTFE) can be subjected to such turning without overstressing the material, and at moderate cost. Hollow cylinders of slight and uniform wall thickness are especially-well suited and satisfy the requirements easily. They favor the automation of the manufacturing process used in producing radial shaft sealing rings of the proposed kind.

The distance between the inside surface and the outside surface of the torsion ribs should diminish very uniformly in order to keep the static loading of the lateral surfaces or flanks of the ribs as equal as possible along their entire length. Furthermore, the flanks which are generally axis parallel can be transversely rounded in order to prevent turbulence of the liquid film while it is being peeled off the relatively-rotating member.

The inside and outside surfaces of the torsion ribs should form with one another an angle of 10° to 60°, and preferably an angle of 30° to 45°. If the angle is smaller than 10°, the mechanical stability of the torsion ribs leaves much to be desired in all suitable materials that are generally available, especially in the projecting portion. Undesirable deformations of the torsion ribs may be the consequence of this. If the angle is greater than 60°, great turbulence will occur in the medium that is to be sealed which, impinging upon the flanks, results in great vibration of the torsion ribs. The sealing action is less satisfactory in this case.

The inner and outer surfaces of the torsion ribs should join one another in a knife-like edge, i.e., the edge facing the sealed medium is to have a cutting-edge like action and stability. In this regard, the sealing ring must have a certain radial thickness adjacent the edge, but this generally should not to exceed 0.5 mm in the case of PTFE and 0.8 mm in the case of rubber, for example.

With these provisions, the film of liquid continuously flowing along the surface of the member that is being sealed is evenly separated or peeled from the member. A small portion of the total volume, however, follows along the surface of the member that is being sealed to the sealing surface where it provides good lubrication, while the greater part of the volume is deflected over the outside surface of the torsion ribs and driven back into the sealed chamber. It never reaches the actual sealing zone to reduce the potential for leakage and, also thereby, is very little stressed from the hydrostatic point of view.

Leading the liquid from the actual sealing zone, as mentioned above, is favored if the root surface is inclined to the inside surface in the same angular sense as the outside surface of the projecting torsion ribs. A spontaneous reversal of the direction of the deflected fluid is even achieved if the root surface and the projecting, outside surface of the torsion ribs are at identical angles of inclination with the inside surface. Such a design assumes that the outside surface, in the area adjoining the root surface, extends parallel to the inside surface and, hence, the outside surface is broken. Suitable results are achieved in practice, however, relatively simply if the sealing ring is cut in a hollow conical shape from a tube which has on its inside or outside axis-parallel ribs uniformly distributed about the circumference, and if the sealing ring is flared back in the direction of the sealed medium before or after it is fixed in a casing about the member to be sealed. The hollow cone thus obtained has some profile curvature. This promotes elastic conformation of the sealing surface to the machine part that is to be sealed.

The proposed radial shaft sealing ring has virtually complete freedom from wear and, in general, results in a polishing effect on the dynamically-sealed, relatively-rotating member without appreciable wearing away of its material. Deposits in the area of the dynamic sealing zone do not occur, and high or frequently-changing rotary speeds are apparently without effect on the reliability of operation that is achieved. The slight, flaring contact pressure of the sealing surface furthermore provides for good accessibility.

DESCRIPTION OF THE DRAWINGS

The appended drawings show exemplary embodiments which illustrate but do not limit the invention and in which.

DESCRIPTION OF THE PREFERRED EMBODIMENTS

Figure 1:
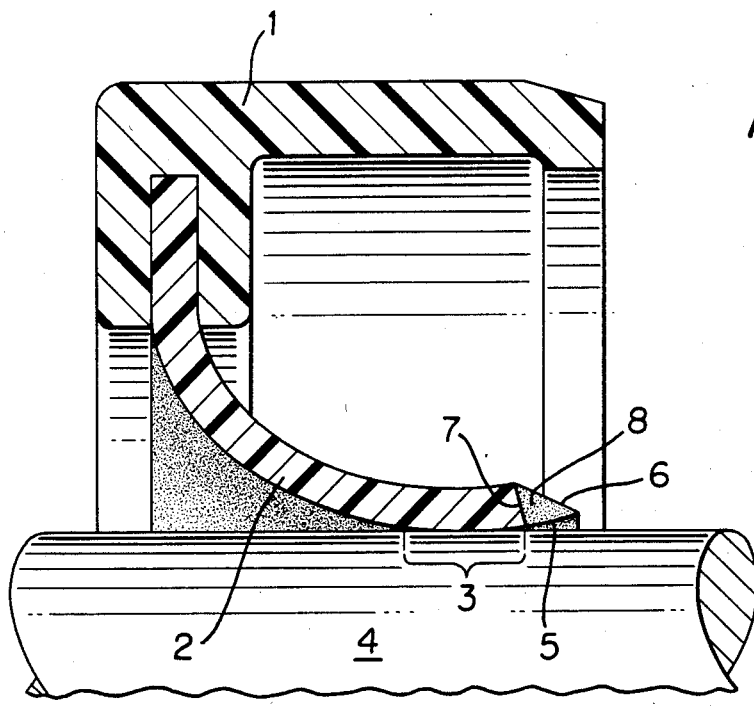
FIG. 1 shows half an axial cross section of one embodiment.

The radial shaft sealing-ring embodiment shown in FIG. 1 has a casing 1 of polypropylene plastic with a PTFE sealing ring 2 clamped therein between inwardly-projecting flanges.

The sealing ring 2 consists of a planar, annular disk which, afterward, has been drawn to one side or flared at its inner portion toward the sealed medium (on the right in the Figure) and about a relatively-rotatable member 4 (in this case the circumference of a shaft) to define a sealing surface area 3 of the ring about the shaft. The edge of the flared end of the sealing ring at the sealing surface 3 and facing the medium that is to be sealed identifies the position of a root surface 7. This surface is substantially perpendicular to the length of the sealing surface 3 and transverse to the plane of the disk. It forms the base from which torsion ribs 8 (only one shown) project.

The torsion ribs are uniformly distributed around the circumference of the sealing ring. They are projections which extend from the root surface 7 and toward the sealed medium (to the right), are integral with the disk body of the sealing ring 2, and of the same material as the sealing ring 2.

The inside surface 5 of each torsion rib 8 is increasingly farther away from the surface of the sealed shaft 4 with increasing distance from the root surface 7. In other words, the sealing ring flares through 90° to a lesser angle. The maximum distance is extremely small, however, and, even after a long time in operation, does not exceed a few tenths of a millimeter.

The outside surface 6 of the torsion ribs is increasingly closer to the inside surface 5 with increasing distance from the root surface 7 until the inside and outside surfaces meet in a knife-like edge. The greatest part of the liquid film flowing along the surface of the sealed shaft is separated onto it and fed back into the sealed chamber. This considerable part of the liquid film therefore is unable to exert any force on the lateral, projecting, flank surfaces of the torsion ribs 8 to deform them. Nevertheless, excellent lubrication of the dynamic sealing zone at the sealing surface 3 is at all times assured by the remainder of the liquid film.

The flank surfaces of the torsion ribs 8 extend radially, which permits an especially easy manufacture. Curved configurations are possible, but the advantages obtained thereby must be balanced against a considerably increased cost of manufacture which, from the economical point of view, is acceptable only in rare cases.

Figure 2:
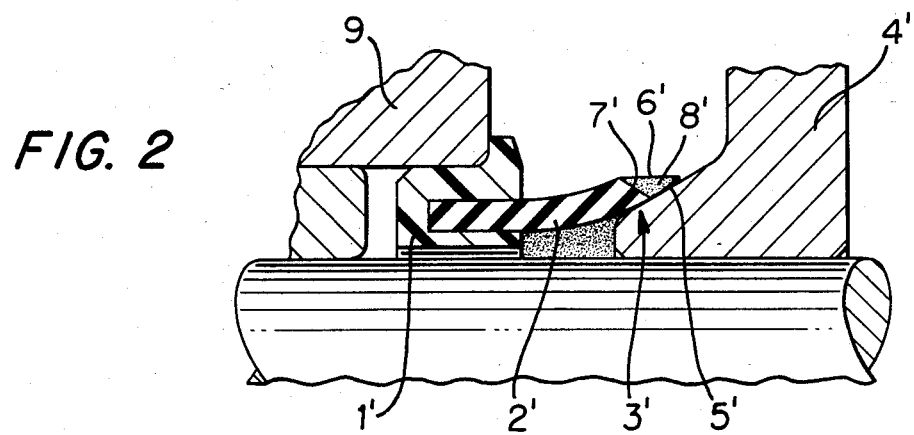
FIG. 2 shows half an axial cross section of a second embodiment.

The radial shaft sealing ring shown in FIG. 2 serves to seal the machine part 9 to the relatively-rotatable member 4'. It consists of a plastic casing 1' which is mounted tightly in a bore in the machine part 9 and the sealing ring 2' projecting therefrom to engage a surface of the relatively-movable member 4' slidingly with its sealing surface 3'. The casing 1' and the sealing ring are locked together in a leak-proof manner.

The sealing ring 2' consists of a tubular rubber sleeve which is resiliently expanded or flared radially to a tangential, tapering surface of the member 4' that is to be sealed. Its contact with the tapered surface defines the sealing area 3' with the root face 7' therebeyond, as in the embodiment described above in connection with FIG. 1. The root surface, however, does not in this embodiment extend transversely across the sealing ring 2', but slopes conically toward the casing 1' in the same angular sense as the outer surface 6' of the torsion ribs 8', thereby facilitating the deflection of fluid peeled off the member 4' by the torsion ribs 8'.

The torsion ribs 8' (only one shown) consist in this case, too, if finger-like projections from the root surface 7' spaced around the circumference of the sealing ring 2'. The flank surfaces of the torsion ribs extend radially and parallel with the rotational axis. The inner faces 5' of the torsion ribs diverge increasingly away from the tapered surface of the machine part 4' with increasing distance from the root surface 7', but this amounts to no more than a few tenths of a millimeter even after a long time in operation.

The distance between the inner surface 5' and the outer surface 6' of each torsion ribs again diminishes with increasing distance from the root surface 7'. The inside surface 5' and the outside surface 6' also again meet one another at a knife-like edge.

Figure 3:
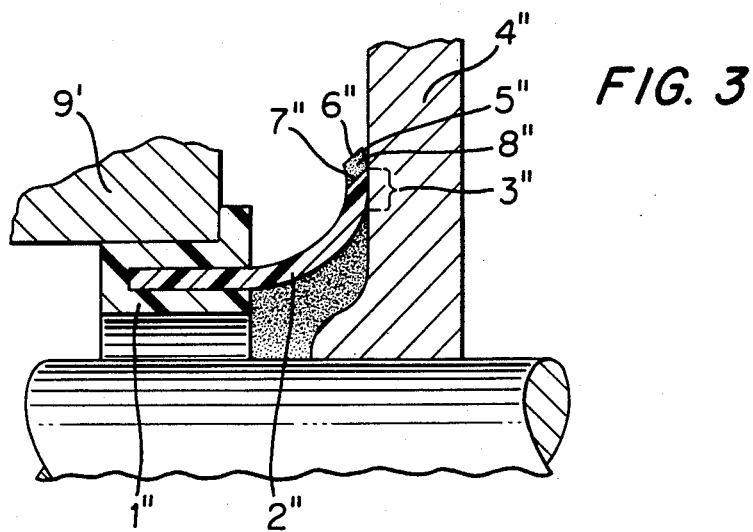
FIG. 3 shows half an axial cross section of a third embodiment.

The shaft sealing ring of FIG. 3 serves to seal a machine part 9' against a radially-extending surface of a machine part 4" which rotates with a shaft that is to be sealed. It consists of a plastic case 1" and the sealing ring 2" fixedly joined together. The casing 1" is pressed in a leak-proof and non-rotatable manner into a socket bored in the machine part 9' and formed directly on an inner or rear edge section of the sealing ring 2".

The sealing ring is made in a hollow conical form and has a large or outside diameter that resiliently flares or enlarges in the area facing the relatively-moving machine part 4". The actual contact between the sealing ring and the relatively moving machine part is limited to the actual sealing surface 3". The end of the sealing surface adjacent the sealed medium determines the position of the root surface 7". The root surface forms an angle of 40° transversely across the sealing ring relative to the sealing surface thereof. The root surface simultaneously forms the base of the torsion ribs 8" (only one shown), which, in the ready-to-operate position represented, are defined by flanks extending radially.

The outside surfaces 6" of the torsion ribs 8" are broken (angularly bent) approximately half way along the ribs.

In the rearward area directly adjoining the root surface 7", a portion of the outer surfaces 6" extend substantially parallel to the inner surfaces 5". Both the continuous approach to the inner surfaces 5" and the broken or stepped approach shown here are, therefore, contemplated by the invention. In the remote, forward portion, the outside surfaces 6" extend parallel to the root surface 7".

Thus, also in this embodiment, the outer and inner surfaces of the torsion ribs intersect at a sharp edge at the forward end of the torsion ribs. The uniform peeling off of the excess liquid film from the surface of the machine part 4" that is to be sealed is favored thereby, as before. Moreover, considerable advantages are obtained as regards manufacture.

Producing the sealing ring 2" of FIG. 3 can be accomplished in an especially simple manner by cutting a hollow conical blank from a tube which is provided on the outside with axis-parallel ribbing corresponding to the torsion ribs. The blanks thus obtained are then turned back on themselves and clamped in the corresponding casing 1" in the manner shown in FIG. 3. This involves no appreciable difficulty. The required tubes can easily be manufactured with uniform quality. Separate formation of the torsion ribs on the individual radial shaft sealing rings can thus be eliminated.

It will be understood that the specification and examples are illustrative but not limitative of the present invention and that other embodiments within the spirit and scope of the invention will suggest themselves to those skilled in the art.

What is claimed is:

1. A sealing ring for sealing a liquid about a relatively-rotating member, comprising:
   an annular sealing ring having a root surface about an edge of the sealing ring adjacent a flarable, substantially-smooth sealing-surface zone of the sealing ring for slidingly-engaging the member; and
   torsion ribs projecting from the root surface and each having an inside surface which is a regular prolongation of the sealing-surface zone, whereby the torsion ribs separate from the member at a small angle, and an opposite, outside surface the distance between which and the inside surface diminishes with increasing distance from the root surface, whereby to avoid rib-deforming force from the liquid upon the relative rotation of the member.

2. The sealing ring of claim 1, wherein the distance between the inside and outside surfaces ribs steadily diminishes.

3. The sealing ring of claim 1, wherein the inside and outside surfaces meet in a knife-like edge.

4. The sealing ring of claim 2, wherein the inside and outside surfaces meet in a knife-like edge.

5. The sealing ring of claim 1, wherein the inside and outside surfaces are at an angle of from about 10° to about 60° to each other.

6. The sealing ring of claim 4, wherein the inside and outside surfaces are at an angle of from about 10° to about 60° to each other.

7. The sealing ring of claim 1, wherein the inside and outside surfaces are at an angle of from about 30° to about 45° to each other.

8. The sealing ring of claim 4, wherein the inside and outside surfaces are at an angle of from about 30° to about 45° to each other.

9. The sealing ring of claim 1, wherein the root surface is inclined to each of the inside surfaces in the same angular sense as the diminishing distance between the inside and outside surfaces.

10. The sealing ring of claim 2, wherein the root surface is inclined to each of the inside surfaces in the same angular sense as the diminishing distance between the inside and outside surfaces.

11. The sealing ring of claim 3, wherein the root surface is inclined to each of the inside surfaces in the same angular sense as the diminishing distance between the inside and outside surfaces.

12. The sealing ring of claim 4, wherein the root surface is inclined to each of the inside surfaces in the same angular sense as the diminishing distance between the inside and outside surfaces.

13. The sealing ring of claim 5, wherein the root surface is inclined to each of the inside surfaces in the same angular sense as the diminishing distance between the inside and outside surfaces.

14. The sealing ring of claim 8, wherein the root surface is inclined to each of the inside surfaces in the same angular sense as the diminishing distance between the inside and outside surfaces.

15. The sealing ring of claim 1, wherein a portion of each of the outside surfaces projects from the root surface, before the distance between it and the inside surface diminishes, substantially parallel to the inside surface.

16. The sealing ring of claim 3, wherein a portion of each of the outside surfaces projects from the root surface, before the distance between it and the inside surface diminishes, the root and the latter portion of the outside surfaces are parallel.

17. The sealing ring of claim 5, wherein the outside surface projects from the root surface before the distance between it and the inside surface diminishes the root and the latter portion of the outside surfaces are parallel.

18. The sealing ring of claim 7, wherein the outside surface projects from the root surface before the distance between it and the inside surface diminishes the root and the latter portion of the outside surfaces are parallel.

19. The sealing ring of claim 9, wherein the outside surface projects from the root surface before the distance between it and the inside surface diminishes the root and the latter portion of the outside surfaces are parallel.

20. The sealing ring of claim 13, wherein the outside surface projects from the root surface before the distance between it and the inside surface diminishes the root and the latter portion of the outside surfaces are parallel.

21. A method of using a sealing ring for sealing a liquid about a relatively-rotating member, comprising:

flaring a sealing-surface zone of an annular sealing ring having torsion ribs projecting from a root surface about an edge of the sealing ring adjacent the sealing-surface zone against the relatively-rotating member so that the inside surface of each torsion rib which is a regular prolongation of the sealing-surface zone separates from the relatively-rotating member at a small angle; and providing an opposite, outside surface on each torsion rib the distance between which and the inside surface diminshes with increasing distance from the root surface sufficiently to avoid rib-deforming force from the liquid upon the relative rotation of the relatively-rotatable member.

22. A sealing ring for sealing a liquid about a relatively-rotating member, comprising:

an annular sealing ring having a root surface about an edge of the sealing ring adjacent a flarable, sealing-surface zone of the sealing ring for slidingly-engaging the member; and torsion ribs projecting from the root surface and each having an inside surface which is a regular prolongation of the sealing-surface zone, means for separating the inside surface from the member, and an opposite, outside surface the distance between which and the inside surface diminshes with increasing distance from the root surface, whereby to avoid rib-deforming force from the liquid upon the relative rotation of the member.

* * * * *